Oct. 19, 1965 H. KÜPPENBENDER ETAL 3,212,418
PHOTOGRAPHIC CAMERA PROVIDED WITH VIEWFINDER INDICATOR FOR
DIFFERENT OPERATING RANGES
Filed Nov. 23, 1962 3 Sheets-Sheet 1

United States Patent Office 3,212,418
Patented Oct. 19, 1965

3,212,418
PHOTOGRAPHIC CAMERA PROVIDED WITH VIEWFINDER INDICATOR FOR DIFFERENT OPERATING RANGES
Heinz Küppenbender, Heidenheim (Brenz), and Edgar Sauer and Heinz Köppen, Stuttgart, Germany, assignors to Zeiss Ikon Aktiengesellschaft, Stuttgart, Germany
Filed Nov. 23, 1962, Ser. No. 244,232
Claims priority, application Germany, Nov. 29, 1961, Z 9,102
26 Claims. (Cl. 95—10)

The invention relates to improvements in photographic cameras which are provided with a number of different operating ranges, such as an automatic exposure adjustment, a flash bulb exposure adjustment and a range for the manual adjustment of the diaphragm.

It is an object of the invention to provide a camera of this type with means which permit the camera user, when looking into the viewfinder, to see which one of the different operating ranges has been adjusted to its operative position. This means consists of an indicating device in combination with a mark, a symbol, a scale, or the like, which appears in the viewfinder area or closely adjacent to it and indicates the operating range to which the camera has been adjusted.

According to another object of the invention, this indicating device is controlled by a manually operable member which is used for the selection of the operating range.

In accordance with a preferred embodiment of the invention, the indicating device consists of a rotatable disc which is provided on its face with marks, symbols, or the like, and is controlled by the manually operable member for the selection of the operating range by means of a cam disc and a scanning lever.

In accordance with another embodiment of the invention the indicating device consists of a lever which is provided with a mark, a symbol, or the like, and is controlled by the manually operable member for the selection of the operating ranges by means of cam portions arranged on a change-over ring for the operating ranges, a control lever, a rotatable shaft and a control member.

According to a third embodiment of the invention the marks for two operating ranges, preferably the one for the range of the automatic exposure adjustment and the one for the manual diaphragm adjustment, are arranged in or adjacent the viewfinder area, while the range of the flash bulb exposure adjustment is indicated by the diaphragm value for the flash exposure. The mentioned marks and the diaphragm scale cooperate with an auxiliary pointer for the purpose of indicating the operating range.

These and other objects of the invention will now be described with reference to the accompanying drawings in which.

Figure 1:
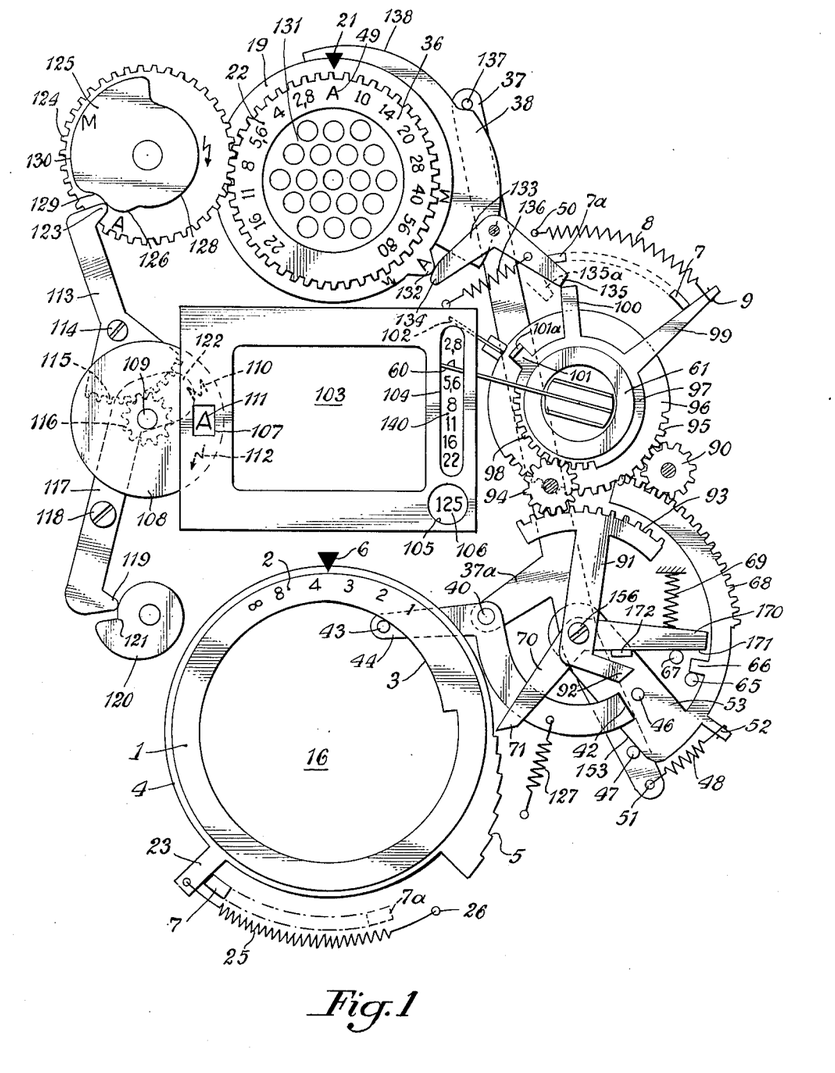
FIG. 1 illustrates in a diagrammatic view the exposure control devices and the viewfinder of one embodiment of a camera in accordance with the invention.

Referring to the drawing, the photographic camera according to FIG. 1 is provided with a distance adjusting ring 1 having a distance scale 2 thereon and being rotatably adjustable with respect to a stationary index 6, and a rotatable diaphragm aperture control ring 4. The two rings 1 and 4 are arranged concentrically around the objective opening 16. The diaphragm control ring 4 of the objective diaphragm is provided on its outer circumference with a series of abutment steps 5 cooperating with the catch tooth 71 provided on a double-armed lever 70, 170. The individual steps of the series of abutment steps 5 correspond in number and distance from each other to the available diaphragm closing steps or diaphragm aperture values of the diaphragm mechanism of the camera objective. The diaphragm mechanism is an automatic one. When the camera is tensioned, the diaphragm mechanism is retained in one of its end positions, preferably in the position of the largest possible diaphragm aperture, by a shutter operated opening and closing member 7 which, when the camera is tensioned, engages the radial arm 23 of the diaphragm control ring 4, and when the camera is released, the member 7 jumps into the position indicated with 7a, whereupon the diaphragm control ring 4 follows the pull of the spring 25 extending between the radial arm 23 and the stationary point 26 and returns in the direction toward the opposite end position until the catch tooth 71 of the double-armed lever 70, 170 comes into engagement with the abutment steps 5 and therewith terminates the return movement of the diaphragm control ring 4.

A distance scanning lever 44 engages by means of a laterally extending scanning pin 43 thereon a distance deflecting cam 3 on the inner circumference of the distance adjusting ring 1. A spring 127 pulls this scanning lever 44 toward the distance deflecting cam 3 which latter imparts to the lever 44 various deflections about its axis of rotation 40 according to the distance value to which the distance adjusting ring 1 has been set. This axis of rotation 40 is formed by a shaft which is mounted on a lateral arm 37a of a scanning lever 37 which cooperates with the deflection cams 38, 138 arranged on the outer circumference of a change-over ring 19 which is mounted concentrically around the photocell aperture. The change-over ring 19 is used for adjusting the camera to its individual operating ranges.

This change-over ring 19 is provided at its front face with a circumferentially extending guide number scale 36, followed by a mark A 49 and by another scale 22 indicating the diaphragm aperture values. The individual values of the scales 36 and 22 as well as the mark A 49 are selectively registrable with a stationary index 21. If a value of the guide number scale 36 is moved opposite this index 21, this means that the operating range of the flash bulb exposure mechanism is in operative position; when the mark A has been moved opposite the index 21, this means that the camera has been adjusted to the range in which the automatic exposure mechanism is operative, and when anyone of the values of the diaphragm aperture scale 22 is brought into opposition with the index 21, both automatic exposure mechanisms are rendered inoperative and only the range of the manual diaphragm adjustment is in effect. This change-over ring 19 is manually operated either directly or by means of a gear wheel 124 which meshes with corresponding gear teeth on the ring 19. The gear wheel 124 carries a cam disc 125 which in addition to a smaller radius 128 and a larger radius 130 is provided with an elevation 126 and a recess 124 between this elevation 126 and the larger radius 130.

The cam face having the smaller radius 128 is coordinated with the flash bulb operating range, the elevation 126 is coordinated with the range of the automatic exposure mechanism, and the cam face having the larger radius 130 is coordinated with the range of the manual diaphragm setting. The cam disc 125 is engaged by one end of a double-armed lever 113 rotatable about an axis 114. This lever 113 engages the cam disc 125 with a nose-shaped end 123, while its opposite end is provided with a toothed sector 115 which is in engagement with a gear wheel 116 mounted together with an indicator disc 108 rotatable about an axis 109. The indicator disc 108 which rotates with the gear wheel 116 is provided on its face with circumferentially spaced indicating marks 110 (M=manual operation), 111 (A=automatic exposure adjustment range), and 112 (flash bulb exposure range) and is mounted in such a manner that these indicating marks 110, 111 and 112, respectively, upon adjustment of the corresponding operating ranges become visible in a window 107 in or adjacent the viewfinder area 103. Furthermore, in the observation range of the window 107 may also appear the preferably red tinted end of another double-armed lever 117 which is rotatable between its ends about an axis 118 and is controlled by a cam disc 120 operated by the shutter winding mechanism. The other end 119 of the lever 117 is shaped as a scanning nose and when this end 119 enters a recess 121 in the cam disc 120, the lever 117 moves into an extreme position in which the lever end 122 is removed from the range of the window opening 107. The upper or tinted end of the lever 117 is used as a device to indicate whether the camera is ready for operation because the shutter has been tensioned. The illustrated position of the cam disc 120 and the lever 117 indicates that the camera is ready for operation because the shutter is tensioned and the film advanced. The opposite position of the cam disc 120, in which the scanning nose 119 engages a high portion of the cam and the lever end 122 appears in the window opening, indicates that the camera is not ready for operation because the shutter tensioning lever, which simultaneously advances the film, has not been operated. The indicating marks 110, 111 and 112 are then covered by the upper end of the lever 117 and can only be made visible when the shutter tensioning lever is actuated. The deflecting cams 38, 138 of the change-over ring 19 are engaged by the scanning pin 137 on the upper end of the lever 37. The most important function of the lever 37 is to transform the selected guide number and the manually selected diaphragm values into suitable deflections which together with the deflections of the distance scanning lever 44 arranged on the distance deflecting cam 3 are transferred to the catch member 70. In order to accomplish this, the lower end of the scanning lever 37 is made rotatable about an axis 156 so that its deflections caused by the cam 38 are converted into corresponding rotative movements of the lever 37. Furthermore, the lever 37 is provided above its axis of rotation with the previously mentioned lateral arm 37a which carries the axis of rotation 40 of the distance scanning lever 44. Finally, in addition to a lever 91 to be described below but which also rotates about the axis 156, there are provided two more levers pivotally mounted about the axis 156 of the lever 37, namely the catch member 70, 170 consisting of two arms, and a radial lever 53 provided with a toothed segment 68 extending concentrically about the axis 156. The catch member 70, 170 is pulled by a spring 69, which engages the lever arm 170, toward its end position which corresponds to the position with respect to the abutment steps 5 that produces the largest diaphragm aperture; a stop 67 limits the rotative tendency of the catch member 70, 170 in this direction. The scanning lever 37 is connected with the radial lever 53 by a spring 48, which is arranged between 51 and 52, in such a manner that the two levers 37 and 53 are drawn together and in such a direction that a radial edge of the lever 53 engages a stop 47 arranged on the lever 37. Furthermore, the lever 53 is provided with a stop 46 which is in cooperation with the radial edge 42 of the scanning lever 44. Finally, the rotative position of the radial lever 53 is limited in one direction by a stop connection which consists of a radial projection 66 on the concentric portion of the lever 53 and a stationary pin 65.

The formation of the flash bulb diaphragm aperture which corresponds to the selected values of guide number and distance is as follows: When the change-over ring 19 is rotated counterclockwise, the scanning pin 137 moves up on the guide number deflecting cam 38 and this results in a more or less extensive clockwise rotation of the scanning lever 37 about the axis 156. This rotation is the more extensive, the higher the guide number is which has been selected. The distance adjustment on the distance scale 2 may be considered as remaining the same. Due to the rotation of the scanning lever 37 in clockwise direction, the distance scanning lever 44, which is pivotally mounted on the shaft 40 carried by the arm 37a which forms a part of the scanning lever 37, also moves clockwise about the axis 156 together with the shaft 40. The lever 44—while the scanning pin 43 engages the distance deflection cam 3—makes, however, also a counterclockwise movement about the pin 43 which serves here as an axis of rotation. This counterclockwise rotative movement of the distance scanning lever 44 about its scanning pin 43 against the action of the spring 127 has the effect that the radial edge 42 of the lever 44 comes into engagement with the pin 46 of the lever 53 so that this lever 53 likewise is rotated in counterclockwise direction about the axis 156. During this rotation of the lever 53 its radial projection 66 engages the side edge 171 of the lever end 170 of the catch member 70, 170 whereby the latter is also rotated about the axis 156 in counterclockwise direction. This has the effect that the lever end 71 functioning as a catch tooth with respect to the abutment steps 5 moves away from the steps 5 so that the lever end 71 in accordance with the adjusted higher guide number comes into engagement with one of the abutment steps 5 only after a longer return movement of the diaphragm control ring 4, namely after the formation of a smaller diaphragm aperture.

If now another distance value is adjusted on the distance scale 2 by rotatably adjusting the ring 1 relatively to the fixed index 6, this new distance value will be superimposed over the selected guide number and the end position of the catch member 70, 170 will change. If, for instance, the smaller distance of 1 meter is adjusted, the distance scanning lever 44 will make a counterclockwise rotation about its shaft 40 as a result of the deflection of the scanning pin 43 by the cam 3 and this rotation of the lever 44 will intensify the deflection of the scanning pin 43 when a higher guide number is selected. Conversely, if a greater distance value is selected, the lever 44 will rotate in clockwise direction about the axis 40 and this rotation is subtracted from the rotation that takes place in counterclockwise direction when higher guide numbers are selected. The sum or difference is transferred, as described, via the stop connection 66, 171 to the catch member 70, 170 whose catch position with respect to the abutment steps 5 stores both selected values.

As already mentioned, the lever 53 is provided with a toothed segment 68 which by means of a small gear wheel 90 is operatively connected with a ring 96 provided with peripheral gear teeth 95 and carrying an indicator hand 102 projecting radially outwardly. When the ring 96 assumes certain positions, this hand 102 plays over a diaphragm scale 140 which appears in an area 104 arranged in or adjacent the viewfinder area 103. When the changeover ring 19 has been adjusted to the operating range in which the automatic exposure mechanism is effective, as is illustrated in FIG. 1, then the indicator hand 102 will not appear in the area 104 of the diaphragm scale 140 because the scanning pin 137 on the upper end of the guide number scanning lever 37 is still outside the range of the guide number deflection cam 38. Neither is the scanning lever 37 able to rotate clockwise about its axis of rotation 156, which could bring about counter deflections of the levers 44 and 53, nor is the lever 44 able—without previous adjustment of a guide number on the ring 19—by a distance adjustment on the distance adjusting ring 1 alone to establish a coupling between its radial edge 42 and the stop pin 46 on the lever 53 so as to deflect this lever. Only upon a selection of a guide number on the change-over ring 19, which means an adjustment of the camera to the operating range of the flash bulb mechanism, will the lever 53, the gear wheel 90 and the ring 96 be rotated in such a manner that the indicating hand 102 appears over the diaphragm scale 140 and indicates the flash diaphragm aperture which is formed automatically upon release of the camera. The diaphragm aperture indicated by the pointer 102 in this case constitutes the diaphragm value which is formed by the automatic flash bulb mechanism in dependence of the guide number and distance adjustment because the distance scanning lever 44 which controls the lever 53 has already combined in its rotative position the sum of both the guide number and the distance values.

The measuring instrument of the exposure meter is designated with 61 and its pointer which is carried by the rotatable armature is designated with 60. The aperture in front of the photocell which supplies the measuring instrument with current is designated with 131. When a large amount of light strikes the photocell, which means a high exposure value, the pointer 60 travels over the entire diaphragm scale 140 and stops at the value $f{:}22$, i.e. the smallest possible diaphragm aperture. When the amount of light is small or in total darkness the pointer 60 will be opposite the aperture value of $f{:}2.8$ or may even travel off the scale 140. The entire measuring instrument 61 may be rotatably arranged as a unit and may be coupled with the shutter speed device and the DIN or ASA indicating device in such a manner that any adjustments of the shutter speed or DIN value result in a corresponding rotation of the measuring instrument and in a change of its pointer position. In this manner a simple coupling connection is made possible among these three factors. The operative coupling possibilities which may be used consist of gear wheels, cable drives, electrical resistance connections, or of a so-called light control coupling in form of a variable diaphragm arranged in front of the photocell.

The embodiment shown in FIG. 1 shows that a ring 97 is coaxially arranged with the axes of rotation of the instrument 61 and of the ring 96. This ring 97 is provided with outwardly extending radial projections 99, 100 and 101 and also with a gear teeth section 98 extending over a portion of its outer circumference. The two rings 96, 97 need not be arranged coaxially with the axis of the measuring instrument 61, but they may also lie above or beneath the instrument. The gear teeth 98 of the ring 97 mest with a gear segment 93 on the double-armed lever 91 which is rotatable about the axis 156 and is provided at the side opposite the gear segment 93 with a stop surface 92 which cooperates with a laterally bent lug 172 provided on the portion 170 of the catch member 70. This arrangement serves the purpose of transferring the scanned position of the pointer 60 to the catch member 70, 170 when the range of the automatic exposure mechanism is effective, and to store this position in a corresponding rotative position of the catch member with respect to the abutment steps 5. Mounted on the camera casing is a bell crank lever 133, one end 134 of which cooperates with a connecting cam 132 provided on the change-over ring 19. This cam 132 becomes operative in the range of the automatic exposure mechanism. The other end 135 of the bell crank lever 133 cooperates with the radial projection 100 on the ring 97 as a counterstop. In the range of the automatic exposure mechanism the bell crank lever 133 becomes ineffective when its end 134 moves up onto the cam 132. In this position the lever 133 has performed such a counterclockwise rotation that its other end 135 is unable to come into engagement with the radial projection 100 of the ring 97. This means that in the range of the automatic exposure mechanism the ring 97 has full command of its rotative movability which is not the case in the other operating ranges. A spring 136 urges the end 134 of the bell crank 133 into engagement with the outer circumference of the change-over ring 19.

When the shutter of the camera is tensioned, the ring 97 is held in an extreme position by the shutter controlled member 7 against the action of a spring 8 which extends between the outer end 9 of the radial projection 99 and a stationary point 50. Only upon release of the camera the member 7 shifts to the position 7a so that the return movement of the ring 97 is made possible. The member 7 may be the same as that part previously described which blocks the diaphragm control ring 4 against running down when the camera is tensioned and releases the ring 4 when the camera is released, but it may also be some other part which is operatively connected with the formerly described member 7. Preferably, the rerun of the diaphragm control ring 4 is a trifle delayed with respect to the start of the operation of the indicator device, clamping device and scanning device and the control of the catch member 70, 170.

When in the adjusted range of the automatic exposure mechanism the camera is released, the ring 97 runs off in counterclockwise direction until its radial projection 101 reaches and engages with its bent end 101a the indicating hand 60 of the measuring instrument 61. The device for clamping indicating hand 60 in its adjusted position is not illustrated, since it is well known. The ring 97 by means of the gear wheel 94 rotates the lever 91 which engages with its stop surface 92 the lug 172 on the portion 170 of the catch member 70 and takes the latter along anti-clockwise. The position of the catch member 70 with respect to the abutment steps 5 corresponds then to the position of the indicator hand 60, and the diaphragm aperture formed by the engagement of one of the steps 5 with the catch tooth 71 corresponds to the measured light value, the adjusted shutter speed and the adjusted DIN film speed.

The radial pointer 102 on the ring 96 is not visible in the range of the automatic exposure mechanism, as already stated. A scanning of the hand 60 of the measuring instrument is not possible in the two other operating ranges because the bell crank lever 133 with its lever end 135 prevents a complete return run of the ring 97. When the lever end 134 has moved off the cam 132, the bell crank lever 133 has made a clockwise rotation which has the result that its lever end 135 reaches the position 135a indicated in dash lines and therewith constitutes a stop for the radial projection 100.

When the camera is adjusted to the range of the manual diaphragm mechanism by bringing one of the values of the diaphragm scale 22 into opposition to the index 21, then the scanning pin 137 on the upper end of the lever 37 moves into the range of the cam 38. The lever 37 performs a counterclockwise rotative movement about the axis 156 so that the stop pin 47 on the lower end of the lever 37 engages the edge 153 of the lever 53 and rotates this lever 53 about the axis 156 in counterclockwise direction. At the same time the ring 96 which carries the pointer 102 is rotated by means of the gear segment 68, the gear wheel 90 and the gear teeth 95 so that also the diaphragm aperture formed upon manual adjustment is indicated in or adjacent the viewfinder area 103. Also the indicating hand 60 of the measuring instrument 61 is visible over the same diaphragm scale 140 so that the camera user also in the range of the manual diaphragm adjustment is able to check his manually adjusted diaphragm aperture by comparing it with the diaphragm aperture indicated by the measuring instrument. During bad weather conditions or when making back lighted exposures, he may correct this adjustment by adding one diaphragm stop to the value measured.

In the range of the automatic flash bulb exposure mechanism the indicating hand 60 may have travelled outside the scale 140 when the flash bulb exposure is made in a completely dark or nearly dark room. However, if a flash bulb exposure is made in daylight in order to obtain a certain effect, the indicating hand 60 will be visible in the scale area 104. Upon adjusting the camera to the desired guide number value and distance, the position of the pointer 102 of the scale 140 indicates the automatically formed diaphragm aperture and in order to adapt to the surrounding daylight, it is now only required to bring the pointer 60 of the measuring instrument into registration with the pointer of the flash bulb aperture by changing the shutter speed value. If corrections are necessary, they may easily be made by providing a distance between the flash bulb aperture pointer and the indicating hand 60 of the measuring instrument.

Under the area 104 of the diaphragm scale 140 and in or adjacent the viewfinder area is provided a window 105 for the shutter speed indication. This can be accomplished in that the shutter speed adjusting member drives a disc which carries a translucent image of the shutter speed scale and the individual numbers of this scale move along behind the window when the disc is rotated. Light entering through apertures provided in the front wall of the camera casing will render the diaphragm scale 140 and the shutter speed value 106 bright and contrasting in the viewfinder area.

The operation of the camera according to FIG. 1 is as follows:

Upon adjustment of the camera to the range of the automatic exposure mechanism by moving the mark A on the change-over ring 19 opposite the index 21, a mark A indicated with 111 and arranged on a disc 108 becomes visible in a window opening 107 provided adjacent the viewfinder area 103. When the shutter is tensioned, the warning signal 122 will be noticed, otherwise the latter is covered up by the mark A at 111. This incidentally, is true also for the other two indications 110 and 112 showing marks of the other operating ranges of the camera.

Since the scanning pin 137 of the lever 37 is situated between the control cams 138 and 38 of the change-over ring 19, this lever 37 is ineffective. It will not affect in any way, neither directly nor indirectly, the catch member 70, 170. The latter will also not be influenced by the distance scanning lever 44 because any deflections of this lever alone do not suffice to bring about a rotation of the lever 53 by means of the edge 42 and the stop 46.

When the camera has been tensioned, the shutter controlled opening and closing member 7 moves into its blocking position which has the effect that the diaphragm control ring 4 as well as the ring 97 take up their end positions against the action of the springs 25 and 8. The indicating hand 60 of the measuring instrument 61 now indicates the prevailing light conditions; its position may be read off from the diaphragm scale 140.

When the camera is released, the member 7 moves into its release position 7a and at the same time the indicating hand 60 is clamped in conventional manner in its indicating position and the ring 97 with the radial projection 101, 101a commences to run off. The diaphragm control ring 4 follows, preferably after a predetermined short delay. Since the bell crank 133 engages with its lever end 134 the cam 132, the ring 97 can rotate until its radial projection 101, 101a comes into engagement with the indicating hand 60. Furthermore, the lever 91 is rotated by the gear wheel 94 and the catch member 70, 170 is rotated by the parts 92, 172. The returning diaphragm control ring 4 upon engagement of one of its steps 5 with the catch tooth 71 comes to rest in a position which in combination with the shutter speed 106 assures a diaphragm aperture which is in compliance with the exposure value requirements.

The adjustment of the camera to the range of the flash bulb exposure mechanism is accomplished by bringing a guide number of the guide number scale 36 arranged on the change-over ring 19 opposite the index 21. This counterclockwise rotation of the change-over ring 19 causes a clockwise rotation of the gear wheel 124. Thereby the scanning end 123 of the lever 113 moves into the range of the cam 128 having a smaller radius. The lever 113 consequently performs a rotation in clockwise direction which has the result that the disc 108 rotates in counterclockwise direction and the mark 112 indicating the automatic flash bulb operating range appears in the window opening 107. This mark 112 remains visible during the entire range of the scale 36 because the cam 128 has during this range a shape which is concentric to its axis of rotation.

The guide number scanning lever 37 rotates clockwise and takes along the distance scanning lever 44 attached at 40 to the lever 37, so that the lever 44 engages with its radial edge 42 the stop 46 on the lever 53 which in turn by means of the parts 66, 170 adjusts the catch member 70, 71 opposite the series of abutment steps 5. The gear segment 68 rotates the ring 96 via the gear wheel 90 and the pointer 102 moves over the diaphragm scale 140 and indicates the flash bulb diaphragm aperture formed by the flash bulb mechanism.

The higher the selected guide member is, the smaller will be the diaphragm aperture, and the same is true for the adjustment of short distances on the distance adjusting ring 1. The selection of a still shorter distance causes the same counterclockwise rotation of the distance scanning lever 44 which is brought about by the adjustment of higher guide numbers. Accordingly, the distance scanning lever 44 will act on the catch member 70, 170 in a corresponding manner. The only difference with respect to the movements of the distance scanning lever 44 is that when the lever 44 is caused to rotate by deflections of the guide number lever 37, it will rotate about its own axis of rotation 40 when this rotation is caused by its own deflections brought about by distance adjustments on the distance adjusting ring 1. When both guide number and distance adjustments are made at the same time, the lever 44 will perform a combined movement about both pivot points.

If under elimination of the automatic operating ranges it is desired to adjust the diaphragm manually, the selected diaphragm value on the scale 22 has to be brought opposite the index 21 which is done by a clockwise rotation of the change-over ring 19. This in turn causes a counterclockwise rotation of the gear wheel 124 so that the scanning end 123 after passing the recess 129 reaches the raised cam portion 130. The thus produced rotation of the lever 113 in counterclockwise direction causes a clockwise rotation of the disc 108 so that the mark 110M will appear in the window 107.

The adjustment of still smaller diaphragm apertures causes the lever 37, whose scanning pin 137 is in engagement with the cam 138, to rotate in counterclockwise direction, whereby the pin 47 engages the edge 153 of the lever 53 and moves the latter counterclockwise, and the catch member 70 is taken along by the parts 66, 171. At the same time the ring 96 is rotated by the gear wheel 90 and the pointer 102 on the ring 96 indicates the value or size of the diaphragm aperture in the viewfinder window 103. Again, the adjusted diaphragm value may be compared with the value measured by the measuring instrument, as is described above.

The bell crank lever 133 is effective in the flash bulb exposure range as well as in the manual diaphragm adjustment range, because the lever end 134 has run off the cam 132. This means that in these two ranges an automatic scanning of the position of the indicating hand 60 is interrupted. In the range of the automatic exposure mechanism and also in the range of the manual diaphragm mechanism a free selection of the distance, i.e. without influencing the catch member 70, 170 by the distance scanning lever 44, is possible because in both operating ranges the rotative position of the lever 37 is such that an engagement of the radial edge 42 with the stop 46 cannot take place by the distance scanning lever 44.

Figure 2:
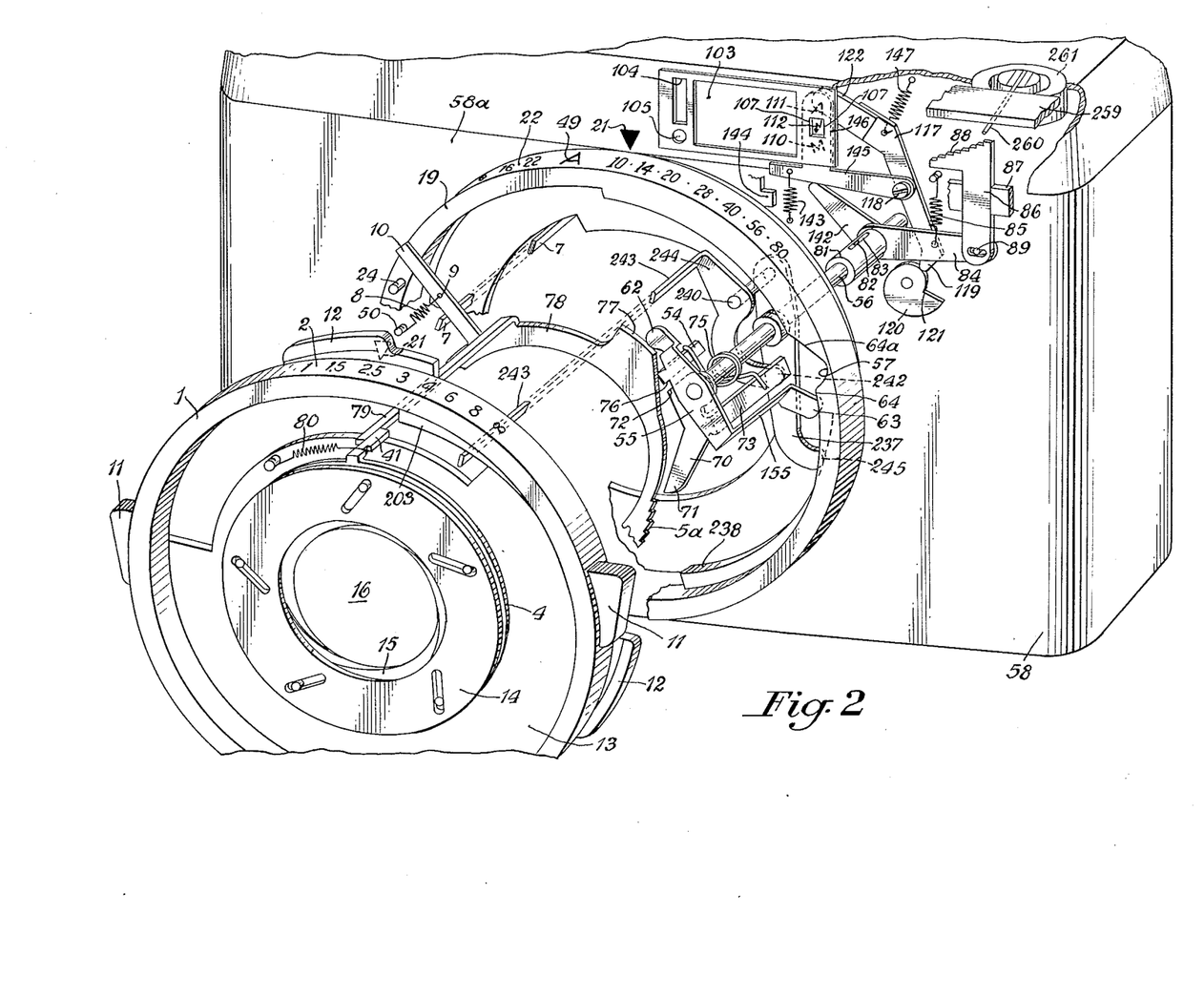
FIG. 2 illustrates diagrammatically a perspective view of a photographic camera embodying the features of the invention as shown in FIG. 1.

FIG. 2 shows a camera casing 58, while the distance adjusting ring again is designated with 1 and the change-over ring for the different operating ranges is designated with 19. The distance adjusting ring 1 is arranged on an exchangeable photographic objective whose aperture is again designated with 16. The distance adjusting ring 1 is provided with a circumferential distance scale 2, while the change-over ring 19 is rotatably arranged on the front wall 58a of the camera casing 58 and is provided with a circumferentially extending guide number scale 36 having the guide numbers 10, 14, 20, 28, 40, 56, 80; a disphragm aperture scale 22 having the diaphragm values $f:1.4$ to $f:22$, while between the adjacent ends of these two scales 36 and 22 the mark A designated with 49 is arranged for adjusting the camera to the automatic exposure range. The distance adjusting ring 1 is provided with handles 11, and 12 indicates the bayonet projections for attaching the exchangeable objective to a mount on the camera casing. The index 21 is used for both adjusting rings 1 and 19, and 13 designates a portion of the mount of the interchangeable lens system.

The diaphragm mechanism is arranged within the interchangeable objective and comprises a stationary diaphragm cage 14 and the previously mentioned rotatable diaphragm aperture control ring or cage 4 which effects the opening and closing of a plurality of diaphragm segments 15. The diaphragm control ring 4 is controlled by an intermediate ring 78 which is mounted on the camera casing 58 and is connected with the diaphragm control ring 4 by a coupling rod 79 extending parallel to the optical axis of the camera objective and engaging an abutment arm 41 arranged on the circumference of the diaphragm cage 4. A spring 80 attached with one end to said arm 41 tends to rotate the diaphragm control ring 4 toward a closing of the diaphragm segments, i.e. counter-clockwise. The intermediate ring 78 is also provided with a radial arm 10 which has attached thereto at 9 one end of a spring 8 the other end of which is attached at 50 to a stationary part of the camera. If the shutter is tensioned, this ring 78 by means of the shutter operated member 7 is held against the action of the spring 8 in one end position which corresponds to a fully open diaphragm aperture. Upon release of the camera, the member 7 snaps back into a position in which the diaphragm mechanism is released for its return movement.

The distance adjusting ring 1 is provided on its inner circumference with a deflection cam 203 which at the shorter distance values projects substantially toward the optical axis, but becomes flatter with the adjustment to larger distance values. The change-over ring 19 is provided on its inner circumference with a deflection cam 238 which conforms to the guide numbers to be adjusted. That portion of the cam 238 which projects closest towards the optical axis corresponds to high guide numbers while the flatter portion farthest away from the optical axis corresponds to smaller guide numbers.

In cooperation with these cams 203 and 238, respectively, are arranged intermediate elements in the form of pivotally mounted scanning levers which individually store the adjusted distance and guide number values and transfer them to an influencing member which in turn stores all adjusted values and upon release of the camera transfers them to the diaphragm mechanism for the purpose of forming the proper diaphragm aperture.

The deflection cam 203 arranged on the distance adjusting ring 1 cooperates with a lateral arm 243 on a scanning lever 244 rotatably mounted between its ends about a pin 240. The deflection cam 238 arranged on the actuating ring 19 cooperates with a scanning lever 237 rotatably supported between its ends by the shaft 56. The scanning lever 237 has a lower curved end 245 which is in engagement with the cam 238. The upper end of the lever 237 carries the pin 240 on which the lever 244 is mounted.

It will be noted from the drawing that any deflections of the scanning lever 237, which take place when the guide number on the change-over ring 19 is changed, have the result that the lever 237 rotates about the axis 56 and that thereby the position of the lever 244 is changed since the pin 240 is carried by the upper end of the lever 237. If the lever 237, for instance, performs a clockwise rotation as a result of a change in the guide number, the pin 240 also rotates clockwise. Since, however, the forward end of the lateral arm 243 of the lever 244 engages the cam 203, it will perform a counterclockwise rotation which means that the lower end 242 of the lever 244 will move upwardly (counterclockwise).

As already stated the lateral arm 243 on the distance scanning lever 244 engages the cam 203 on the distance adjusting ring 1. If shorter distance values are adjusted, the arm 243 follows the deflection of the cam 203 and moves counterclockwise, namely toward the optical axis, which has the result that the lower end 242 of the lever 244 moves upwardly. It will be noted that an adjustment to higher guide numbers and smaller distance values will bring about a counterclockwise rotation of the scanning lever 244, while in the illustrated position an adjustment of larger distance values will result in a clockwise rotation of the lever 244. An adjustment to still smaller guide numbers as indicated is not possible because the index 21 is already opposite the smallest guide number 10.

Owing to the fact that the axis of rotation of the scanning lever 244 formed by the pin 240 is carried by the scanning lever 237, both scanned values are stored in the lever 244. In other words, the position of the lever end 242 constitutes the result of the adjusted values of guide number and distance. The lever end 242 thus is adapted to control an influencing member which in cooperation with the diaphragm mechanism determines the formation of the diaphragm aperture for the automatic flash bulb exposure range.

The control of such an influencing member by the lower end 242 of the lever 244 is made possible according to a particular feature of the invention in that the lever end 242 is brought into engagement with a laterally extending arm 73 provided on the catch lever 70 which serves as an influencing member for the diaphragm mechanism and is provided at its lower end with the tooth 71. This catch lever 70 is loosely rotatably mounted between its ends on the same shaft 56 which forms the rotatable support for the scanning lever 237. This shaft 56 forms at the same time the operating shaft for the scanning device associated with the measuring instrument indicating hand 260 which in the range of the automatic exposure mechanism is used to determine the size of the diaphragm aperture. This scanning device consists primarily of a link combination 84, 86 connected by a pin and slot connection 89, wherein the vertically movable link 86 is guided for vertical movement in a slide bearing 87. The link 86 has arranged at its upper end an enlargement provided with a series of steps 88 which cooperate with the indicating hand 260 of the measuring instrument 261. One end of the link 84 is attached to a sleeve 81 which by means of a pin and slot connection 82, 83 is held in operative connection with the operating shaft 56 even when the camera objective is axially adjusted during focusing. A spring 85 acts upon the link 84 and seeks to pull the link 86 upwardly and rotate the shaft 56 counterclockwise.

The automatic exposure control mechanism also contains a control lever 55 which is fixedly mounted on the rotatable shaft 56. This control lever 55 has a lower offset scanning end 63 arranged on a horizontal portion 155 of the lever 55, an upper scanning end 62 and a lug 54 which is engaged by one end of a torsion spring 75 coiled about the shaft 56. The other end of the torsion spring 75 engages a lateral projection 73 of the catch lever 70. This spring 75 seeks to urge the lever end 62 against a raised portion 77 on the intermediate ring 78 and the lever end 63 against the cam surfaces 64 and 64a on the change-over ring 19. Furthermore, the spring 75 by means of the coupling 242 causes the scanning projection 243 of the lever 244 to be pressed against the cam 3 while the scanning end 245 of the lever 237 is pressed against the cam 238. Finally, the spring 75 also urges the tooth 71 of the catch lever 70 toward its operative position with the intermediate ring 78.

The intermediate ring 78 is provided with a series of abutment steps 5a which are approximately radial. This series of abutment steps 5a form together with the catch member 70 a path compensator which permits the catch member 70 to adjust the diaphragm to predetermined apertures after release of the ring 78 and subsequent rerun because the catch member 70 is forced to assume predetermined angular positions. If for instance the tooth 71 of the catch lever 70 is close to the series of steps 5a as a result of an adjusted long distance and a small guide number, the return of the ring 78 and therewith of the diaphragm control ring 4 effected by the camera release will be stopped already after only a small movement which means that the diaphragm has not been closed or only very little. If, however, a higher guide number and a shorter distance value has been set, then the tooth 71 of the catch member 70 will be positioned at a larger distance away from the series of abutment steps 5a. Consequently, the return movement of the ring 78 will be much longer before it comes to an engagement between the series of steps 5a and the tooth 71, which means that the diaphragm has been closed down to a smaller aperture.

It has been described before that the upper end 63 of the control lever 55 engages the change-over ring 19 at the areas 64 and 64a on the inner circumference of this ring. Between these areas 64 and 64a is arranged a recess 57 into which the lever end 63 may enter. The areas 64, 64a form the disconnecting areas for the automatic exposure control mechanism which come into effect when the camera has been adjusted for using the flash bulb exposure mechanism or the range of the manual diaphragm setting, whereas the recess 57 acts as a connecting cam when the automatic exposure control mechanism is to be employed In this case the lever end 63 drops into the recess 57 and the prior blocking of the movability of the control lever 55 and the shaft 56 is eliminated.

It also has been stated before that the upper end 62 of the lever 55 engages the projection 77 of the intermediate ring 78 which likewise effects a blocking of the scanning device (the shaft 56 and the scanning means 84 to 89). This blocking takes place, however, only in the tensioned condition of the camera. Upon release of the camera the ring 78 commences to run counterclockwise whereby the lever end 62 slides off the projection 77 of the ring 78 and becomes freely movable. This means that in the tensioned camera the scanning device 84 to 89 is not operative. The indicating hand 260 of the measuring instrument 261 is able to move freely and into a position which corresponds to the prevailing light conditions of the object to be photographed. Only upon release of the camera the scanning device is set free, the bar 86 with the scanning steps 88 jumps upwardly and comes to rest in an abutting position which depends from the adjusted position of the pointer. Obviously, there is provided a clamping device for the indicating hand 260 which becomes effective in advance of the operation of the bar 86. The drawing shows only one clamping plate of this well known clamping device, namely the lower plate 259. The operation of the scanning device results in a definite rotative movement of the shaft 56 which in turn results in a corresponding taking along and adjusting of the catch lever 70 by means of the coupling surfaces 72, 76.

The radial arm 10 on the intermediate ring 78 is positioned in such a manner that it serves as a stop for a pin 24 on the ring 19. These two parts 10 and 24, when engaged, constitute the manual diaphragm adjustment. The stop 24 constitutes the preselection stop in the range of the manual diaphragm adjustment. If an aperture f:22 has been adjusted, the stop 24 is at its greatest distance away from the arm 10 which means that upon release of the camera the rings 78 and 4 are able to perform the longest possible return, whereas the return run is the shortest when the diaphragm aperture has been set to its largest size.

Upon attaching the interchangeable camera objective to the camera casing by means of the bayonet projections 12, the coupling projections 41 and 79 come into engagement with one another and the lateral scanning arm 243 on the lever 244 comes into engagement with the distance deflection cam 203.

For the purpose of controlling the indication of each operating range, the shaft forming the axis 56 has fixedly mounted thereto a control arm 142 which transfers the rotative movements forced upon the shaft by the scanning end 63 of the control lever 55 to the range indicating device. This device consists in FIG. 2 of a horizontal lever 145, one end of which is pivoted about the axis 118 and is movable against the action of a spring 143. The lever 145 is provided with a vertical projection 146 carrying the translucent marks 110M, 111A and 112 (flash bulb). These marks are positioned behind the window 107 arranged adjacent the viewfinder window 103. When the range of the flash bulb exposure mechanism is adjusted, the scanning end 63 of the control lever 55 has engaged the cam portion 64 which protrudes less in the direction of the optical axis. The resulting rotative position of the control lever 55 has the effect that the horizontal lever 145 is raised by the arm 142 until the flash mark 112 appears in the window 107.

When the change-over ring 19 is rotated for the purpose of adjusting the camera to the range of the automatic exposure mechanism, the scanning end 63 of the control lever 55 drops into the recess 57 which causes a rotation of the lever 55 and the shaft 56 on which it is fixed, in clockwise direction. The arm 142 and therewith the horizontal lever 145 drop somewhat and the mark 111, namely A, appears in the window 107.

When the range of the manual diaphragm adjustment is selected by rotating the change-over ring 19 until one of the values of the diaphragm scale 22 is opposite the index 21, then the scanning end 63 of the control lever 55 engages the cam portion 64a which projects farther toward the optical axis. The resulting increased clockwise rotation of the control lever 55 and its shaft 56 causes the horizontal level 145 to move into its highest position so that the mark 110, namely M, appears in the window 107.

The warning signal 117 to 122 and the spring 147 are identical with those described in connection with FIG. 1.

In the range of the automatic exposure mechanism there is further provided a stop 144 for limiting the downward movement of the lever 145. This stop 144 prevents an excessive rotation of the lever 145 and provides for its scanning action a stop in downward direction, whereby it is assured that in the range of the automatic exposure mechanism the mark 111A is visible in the tensioned as well as in the released condition of the camera.

The operation in accordance with the preceding disclosure is as follows: If the flash bulb exposure mechanism is to be used, the scanning levers 244 and 237 which correspond to the shape of the cams 203 and 238, respectively, are deflected. The counterclockwise rotation of the lever 244, which unites the sum of the deflections in its lever end 242, is the larger the smaller the adjusted distance and the higher the adjusted guide number is. The upward movement of the lever end 242 resulting from this counterclockwise rotation effects a taking along of the catch lever 70 also in counterclockwise direction so that the tooth 71 moves more and more away from the series of abutment steps 5a. This means that upon release of the camera and subsequent return run of the ring 78 the series of steps 5a will come into engagement with the tooth 71 only after a certain time so that a correspondingly smaller diaphragm aperture is formed.

Longer distances and lower guide numbers have a reverse result. The two scanning levers 237 and 244 perform clockwise movements so that the catch lever 70 also moves in clockwise direction. The tooth 71 therefore is close to the series of steps 5a so that already after a short return run of the ring 78 an engagement of the tooth 71 and the closest steps of the series of steps 5a will take place. Thus, the diaphragm is not closed at all or only to a negligible degree.

When the camera is adjusted for using the flash bulb exposure mechanism, any operation of the other adjustable operating ranges is precluded. The scanning device of the automatic exposure control mechanism is blocked in that the control lever 55 rests against one of the elevations 64 on the ring 19 and is therefore unable to move. The shaft 56 therefore serves only as a pivot for the scanning lever 237 and the catch lever 70. To influence the diaphragm mechanism by the pin 24 in the range of the manual diaphragm selection is not possible since the pin 24 is so far away from the radial arm 10 that an encounter is impossible.

If now the camera is adjusted to the operating range of the automatic exposure control mechanism by moving the mark A49 opposite the index 21, the lever end 63 of the control lever 55 will drop into the recess 57 of the ring 19 and the control lever 55 with the shaft 56 and the scanning device 84 to 89 are ready for action. In the tensioned condition of the camera, however, an operation is still not possible because the upper lever end 62 of the lever 55 is placed on the elevation 77 of the ring 78. Only when the camera is released and the ring 78 performs its counterclockwise return movement, the lever end 62 will run off the elevation 77, and the scanning device 84 to 89 is permitted to operate with the aid of the spring 85 for bringing one of the steps 88 into engagement with the indicating hand 260. The control lever 55, which serves not only for switching the automatic exposure control mechanism on and off in dependence of the selected range, but also for the direct taking along of the catch lever 70 (areas 72, 76), now guides the catch lever 70 into the rotative position which corresponds to the position of the scanning device and after a shorter or longer return run of the ring 78 an engagement of the tooth 71 with one step of the series of steps 5a will take place and therewith the corresponding formation of the diaphragm aperture. Upon a new tensioning of the camera the lever end 62 again will move up on the elevation 77 and the connection between the indicating hand 260 and the steps 88 is interrupted.

When the camera is adjusted to the operating range of the manual diaphragm selection by moving one of the values of the diaphragm scale 22 opposite the index 21, the pin 24 is moved so closely to the radial arm 10 that a diaphragm aperture corresponding to the selected values is assured by the engagement of the arm 10 with the pin 24 upon release of the camera.

Figure 3:
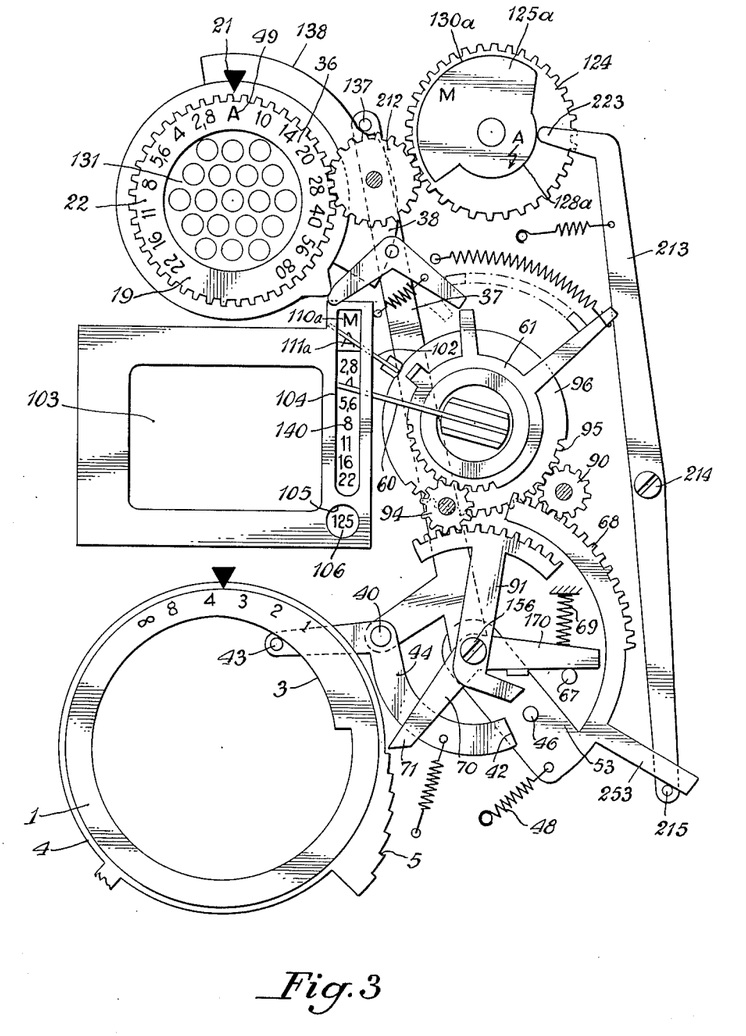
FIG. 3 illustrates a view similar to FIG. 1 of a somewhat modified construction of a camera in accordance with the invention.

The embodiment illustrated in FIG. 3 is a modification of the embodiment illustrated in FIG. 1. While in FIG. 1 and also in FIG. 2 the indications of the different operating ranges are arranged on one side of the viewfinder area and the diaphragm and the shutter are arranged adjacent the opposite side of the viewfinder area, FIG. 3 shows that all indications are concentrated on one side. The operating ranges of the manual diaphragm setting and the automatic exposure setting are indicated by the symbols M and A, respectively, as in the embodiment of FIG. 1. The flash bulb exposure mechanism in the embodiment of FIG. 3 is, however, not announced by a symbol; it is indicated in that the pointer 102 travels over the diaphragm scale so that the diaphragm aperture formed by the flash bulb mechanism may be read off. In accordance with the different features of the embodiment of FIG. 3, the mechanical parts have been changed correspondingly. The change-over ring 19 for adjusting the camera to the different operating ranges cooperates by means of an intermediate gear wheel 212 with the gear wheel 124 which is provided with a cam disc 125a similar to the cam disc 125 known from FIG. 1. This cam disc 125a, however, is provided with only two control faces, namely the radius 128a and the radius 130a, since only two operating ranges have to be indicated. The radius 128a serves by means of a scanning mechanism to indicate the symbol A111a in the viewfinder. Also in the range of the flash bulb exposure mechanism the radius 128a is scanned but does not bring about an indication. The larger radius 130a is associated with the range of the manual diaphragm adjustment; its scanning causes the symbol M110a to appear in the viewfinder. The indication of the marks of the operating ranges takes place by the automatic superimposition of the auxiliary pointer 102.

The scanning mechanism mentioned before consists substantially of the lever 213 which is provided with a scanning nose 223, a control pin 215 and a supporting shaft 214 between its ends. The control pin 215 cooperates with a radial arm 253 on the lever 53. This lever 53 is pretensioned by a spring 48 in such a manner that the radial arm 253 engages the control pin 215.

In or adjacent the viewfinder area 103 and above the vertically extending area 104 of the diaphragm scale 140 is arranged the indication for the different operating ranges. This indication consists, as already stated, of the marks M110 and A111 which are in cooperation with the pointer 102 on the ring 96. Below the area 104 of the diaphragm scale 140 is arranged the shutter speed indication 106. The remaining parts and their mode of operation are the same as disclosed in FIG. 1.

The operation of the embodimentt illustrated in FIG. 3 is as follows: When the camera is to be changed from the range of the automatic exposure mechanism, as illustrated, to the range of the flash bulb exposure mechanism, the change-over ring 19 is rotated in counterclockwise direction. The disc 124 connected with the ring 19 by the intermediate gear wheel 212 also rotates counterclockwise, but has no effect on the position of the scanning lever 213 since the scanning nose 223 of this lever 213 engages a cam 128a which is concentric to the axis of rotation of the cam 125a. The diaphragm aperture formed by the flash bulb mechanism in dependence of the guide number and distance adjustment is indicated on the diaphragm scale 140 by the pointer 102 because the scanning lever 37 has engaged the guide number deflecting cam 38 and the distance scanning lever 44 is deflected by the distance deflecting cam 3 arranged on the distance adjusting ring 1. As described in connection with FIG. 1, owing to these deflections of the scanning levers the catch member 70, 170 is moved with respect to the abutment steps 5 and also the ring 96 with its auxiliary pointer 102 is adjusted so that the diaphragm aperture formed by the flash bulb exposure mechanism will be indicated. Since due to the deflections of the scanning levers 37, 44 the lever 53 has made a counterclockwise rotation, its projection 253 is lifted from the control pin 215 of the scanning lever 213.

When the camera is changed from this range of the automatic exposure mechanism to the range of the manual diaphragm formation, the change-over ring 19 is moved clockwise away from the illustrated position. Since the gear wheel 124 performs also a rotation in clockwise direction, the scanning nose 223 of the lever 213 will engage the larger cam 130a which effects a clockwise rotation of the lever 213. This clockwise rotation of the lever 213 results in a rotation of the lever 53 in the same direction which is accompanied by a clockwise rotation of the intermediate gear wheel 90 and of the ring 96. Thus it is assured that the pointer 102 on the ring 96 moves over the mark 110M so that the range of the manual diaphragm adjustment is indicated in the viewfinder.

What we claim is:

1. In a photographic camera, the combination with a camera casing, of a photographic lens system, a viewfinder, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges including a flash bulb operation, an automatic exposure operation and a manual diaphragm aperture adjustment, indicating means visible when looking into said viewfinder for indicating by means of distinctive marks to which one of said operating ranges the camera has been adjusted by said change-over ring and means operatively connecting said change-over ring with said indicating means.

2. In a photographic camera, the combination with a camera casing, of a photographic lens system, a viewfinder, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges, including a flash bulb operation, an automatic exposure operation and a manual diaphragm aperture adjustment, and indicating means visible when looking into said viewfinder for indicating by means of distinctive marks to which one of said operating ranges the camera has been adjusted by said change-over ring, said indicating means comprising a rotatably mounted disc provided with a plurality of marks each of which designates one of said different operating ranges, and means operatively connecting said disc with said change-over ring.

3. In a photographic camera, the combination with a camera casing, of a photographic lens system, a viewfinder, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges, including a flash bulb operation, an automatic exposure operation and a manual diaphragm aperture adjustment, and indicating means visible when looking into said viewfinder for indicating by means of distinctive marks to which one of said operating ranges the camera has been adjusted by said change-over ring, said indicating means comprising a rotatably mounted disc provided with a plurality of marks each of which designates one of said different operating ranges, a pivotally mounted lever of which one end is in geared connection with said disc, while the other end of said lever loosely engages a rotatably mounted cam which is in geared connection with said change-over ring.

4. In a photographic camera, the combination with a camera casing, of a photographic lens system, a viewfinder, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges, including a flash bulb operation, an automatic exposure operation and a manual diaphragm aperture adjustment, and indicating means visible when looking into said viewfinder for indicating by means of distinctive marks to which one of said operating ranges the camera has been adjusted by said change-over ring, said indicating means comprising a rotatably mounted disc provided with a plurality of marks each of which designates one of said different operating ranges, a pivotally mounted lever of which one end is in geared connection with said disc, while the other end of said lever loosely engages a rotatably mounted cam which is in geared connection with said change-over ring, said cam being provided with a number of cam portions extending concentrically to the axis of rotation of said cam but of different radii and having a circumferential length corresponding to the length of the different operating ranges of said camera.

5. In a photographic camera, the combination with a camera casing, of a photographic lens system, a viewfinder, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges, including a flash bulb operation, an automatic exposure operation and a manual diaphragm aperture adjustment, and indicating means visible when looking into said viewfinder for indicating by means of distinctive marks to which one of said operating ranges the camera has been adjusted by said change-over ring, said indicating means comprising a pivotally mounted lever, one end of which carries a plurality of marks each of which designates one of said different operating ranges while the other end of said lever is pivotally supported in the camera casing, and means operatively connecting said lever with said change-over ring to be adjusted by the latter.

6. In a photographic camera, the combination with a camera casing, of a photographic lens system, a viewfinder, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges including a flash bulb operation, an automatic exposure operation and a manual diaphragm aperture adjustment, and indicating means visible when looking into said viewfinder for indicating by means of distinctive marks to which one of said operating ranges the camera has been adjusted by said change-over ring, said indicating means comprising a pivotally mounted lever, one end of which carries a plurality of marks each of which designates one of said different operating ranges while the other end of said lever is pivotally supported in the camera casing, and means operatively connecting said lever with said change-over ring to be adjusted by the latter, said last named means including a plurality of cam faces on said change-over ring, each one of said cam faces corresponding to a certain one of said different operating ranges, a pivotally mounted control lever adapted to successively engage said cam faces when said change-over ring is rotatably adjusted, and an arm operated by said control lever for transferring its movement to said lever which carries said plurality of marks.

7. A photographic camera according to claim 6, including means operated by said cam faces on said change-over ring for connecting and disconnecting said exposure meter.

8. A photographic camera according to claim 6, including a rotatably mounted shaft 56 extending parallel to the optical axis of said lens system and on which said control lever and said arm are fixedly mounted, said shaft also carrying a catch lever 70 cooperating with a series of abutment steps provided on a spring operated diaphragm aperture adjusting ring and limiting the rotative adjustment of the latter when said catch lever comes into engagement with one of said abutment steps.

9. In a photographic camera, the combination with a camera casing, of a photographic lens system, a viewfinder, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges, such as flash bulb operation, automatic exposure operation and manual diaphragm aperture adjustment, indicating means visible when looking into said viewfinder for indicating by means of distinctive marks to what operating range the camera has been adjusted by said change-over ring, and another indicating means visible when looking into said viewfinder for indicating the value of the automatically adjusted diaphragm aperture, the value of the manually adjusted diaphragm aperture, and the selected shutter speed.

10. A photographic camera according to claim 9, in which the marks of said first mentioned indicating means appear adjacent one side of the viewfinder area, and the marks of said other indicating means appear adjacent the opposite side of said viewfinder area.

11. A photographic camera according to claim 9, in which the indicating marks of both said indicating means appear adjacent one side of the viewfinder area.

12. A photographic camera according to claim 9, in which the indicating marks of both said indicating means appear adjacent one side of the viewfinder area, the mark for indicating diaphragm aperture values comprising a stationary diaphragm aperture scale and a movable indicating hand 102 the adjustment of which is controlled by said change-over ring.

13. A photographic camera according to claim 9, in which the indicating marks of both said indicating means appear adjacent one side of the viewfinder area, the mark for indicating diaphragm aperture values comprising a stationary diaphragm aperture scale and a movable indicating hand 102 the adjustment of which is controlled by said change-over ring, said diaphragm aperture scale having arranged thereon the marks indicating the different operating ranges of the camera.

14. A photographic camera according to claim 9, in which the indicating marks of both said indicating means appear adjacent one side of the viewfinder area, the mark for indicating diaphragm aperture values comprising a stationary diaphragm aperture scale and a movable indicating hand 102 the adjustment of which is controlled by said change-over ring, the indication that the flash bulb exposure range is in operative position being furnished by the indication of the corresponding flash diaphragm aperture.

15. A photographic camera according to claim 9, in which the indicating marks of both said indicating means appear adjacent one side of the viewfinder area, the mark for indicating diaphragm aperture values comprising a stationary diaphragm aperture scale and a movable indicating hand 102 the adjustment of which is controlled by said change-over ring, said indicating hand in the adjustment of the camera to its flash bulb range indicating the diaphragm aperture value to which the diaphragm has been automatically adjusted.

16. A photographic camera according to claim 9, in which the indicating marks of both said indicating means appear adjacent one side of the viewfinder area, the mark for indicating diaphragm aperture values comprising a stationary diaphragm aperture scale and a movable indicating hand 102 mounted on a rotatable ring member 96 which is operatively connected by gear means with a rotatably mounted lever mechanism operated by cam means on said change-over ring, said indicating hand —when the camera is adjusted to its flash bulb exposure range—indicating the diaphragm aperture value to which the diaphragm has been automatically adjusted.

17. A photographic camera according to claim 9, in which the indicating marks of both said indicating means appear adjacent one side of the viewfinder area, the mark for indicating diaphragm aperture values comprising a stationary diaphragm aperture scale and a movable indicating hand 102 the adjustment of which is controlled by a cam 125 which is operatively connected with said change-over ring, said cam having two different cam faces for actuating a pivotally supported scanning lever 213 which in the automatic exposure adjustment and in the flash bulb exposure range is actuated by one 128a of said two cam faces and in the manual diaphragm adjustment range is actuated by the other one (130a) of said cam faces.

18. A photographic camera according to claim 9, in which the indicating marks of both said indicating means appear adjacent one side of the viewfinder area, the mark for indicating diaphragm aperture values comprising a stationary diaphragm aperture scale and a movable indicating hand 102 the adjustment of which is controlled by a rotatably mounted cam 125 which is operatively connected with said change-over ring, said cam having two different cam faces 128a and 130a for engaging one end of a scanning lever 213 pivotally supported between its ends, said lever being actuated in the automatic exposure adjustment range and in the flash bulb exposure range by one 128a of said cam faces and in the manual adjustment range being actuated by the other one 130a of said cam faces, the other end of said lever carrying a pin 215 engaging an abutment 253 on a lever and gear mechanism operatively connected with said indicating hand 102.

19. In a photographic camera, the combination with a camera casing, of a photographic lens system, a viewfinder, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges, such as flash bulb operation, automatic exposure operation and manual diaphragm aperture adjustment, indicating means visible when looking into said viewfinder for indicating by means of distinctive marks to what operating range the camera has been adjusted by said change-over ring, and automatically operated means 122 for covering any one of said distinctive marks which has been moved into operative position as soon as the camera has been released.

20. In a photographic camera, the combination with a camera casing, of a photographic lens system, a viewfinder having a rectangular viewfinder area, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges including a flash bulb operation, an automatic exposure operation and a manual diaphragm aperture adjustment, indicating means visible when looking into said viewfinder for indicating by means of distinctive marks to which one of said operating ranges the camera has been adjusted by said change-over ring, and another indicating means visible when looking into said viewfinder for indicating the value of the automatically adjusted diaphragm aperture, the value of the manually adjusted diaphragm aperture, and the selected shutter speed, the marks of said first mentioned indicating means appearing adjacent one side of said viewfinder area and the marks of said other indicating means appearing adjacent the opposite side of said viewfinder area.

21. In a photographic camera, the combination with a camera casing, of a photographic lens system, a viewfinder, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges including a flash bulb operation, an automatic exposure operation and a manual diaphragm aperture adjustment, indicating means visible when looking into said viewfinder for indicating by means of distinctive marks to which one of said operating ranges the camera has been adjusted by said change-over ring, and another indicating means visible when looking into said viewfinder for indicating the value of the automatically adjusted diaphragm aperture, the value of the manually adjusted diaphragm aperture, and the selected shutter speed, said first mentioned indicating means comprising a rotatably mounted disc provided with a plurality of marks each of which designates one of said different operating ranges, a pivotally mounted lever one end of which is in geared connection with said disc while the other end of said lever loosely engages a rotatably mounted cam which is in geared connection with said change-over ring, said cam being provided with a number of cam portions extending concentrically to the axis of rotation of said cam but of different radii and having a circumferential length corresponding to the length of the different operating ranges of said camera.

22. In a photographic camera, the combination with a camera casing, of a photographic lens system, a viewfinder having a rectangular viewfinder area, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges including a flash bulb operation, an automatic exposure operation and a manual diaphragm aperture adjustment, indicating means visible when looking into said viewfinder for indicating by means of distinctive marks to which one of said operating ranges the camera has been adjusted by said change-over ring, and another indicating means visible when looking into said viewfinder for indicating the value of the automatically adjusted diaphragm aperture, the value of the manually adjusted diaphragm aperture, and the selected shutter speed the marks of said first mentioned indicating means appearing adjacent one side of said viewfinder area and the marks of said other indicating means appearing adjacent the opposite side of said viewfinder area, the mark for indicating diaphragm aperture values comprising a stationary diaphragm aperture scale and a movable indicating hand 102 the adjustment of which is controlled by said change-over ring.

23. In a photographic camera, the combination with a camera casing, of a photographic lens system, a viewfinder having a rectangular viewfinder area, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges including a flash bulb operation, an automatic exposure operation and a manual diaphragm aperture adjustment, indicating means visible when looking into said viewfinder for indicating by means of distinctive marks to which one of said operating ranges the camera has been adjusted by said change-over ring and another indicating means visible when looking into said viewfinder for indicating the value of the automatically adjusted diaphragm aperture, the value of the manually adjusted diaphragm aperture, and the selected shutter speed, the marks of said first mentioned indicating means appearing adjacent one side of said viewfinder area and the marks of said other indicating means appearing adjacent the opposite side of said viewfinder area, the mark for indicating diaphragm aperture values comprising a stationary diaphragm aperture scale and a movable indicating hand 102 the adjustment of which is controlled by said change-over ring, said indicating hand in the adjustment of the camera to its flash bulb range indicating the diaphragm aperture value to which the diaphragm has been automatically adjusted.

24. In a photographic camera, the combination with a camera casing, of a photographic lens system, a viewfinder having a rectangular viewfinder area, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges including a flash bulb operation, an automatic exposure operation and a manual diaphragm aperture adjustment, indicating means visible when looking into said viewfinder for indicating by means of distinctive marks to which one of said operating ranges the camera has been adjusted by said change-over ring, and another indicating means visible when looking into said viewfinder for indicating the value of the automatically adjusted diaphragm aperture, the value of the manually adjusted diaphragm aperture, and the selected shutter speed, the marks of said first mentioned indicating means appearing adjacent one side of said viewfinder area and the marks of said other indicating means appearing adjacent the opposite side of said viewfinder area, the mark for indicating diaphragm aperture values comprising a stationary diaphragm aperture scale and a movable indicating hand 102 mounted on a rotatable ring member 96 which is operatively connected by gear means with a rotatably mounted lever mechanism operated by cam means on said change-over ring, said indicating hand—when the camera is adjusted to its flash bulb exposure range—indicating the diaphragm aperture value to which the diaphragm has been automatically adjusted.

25. In a photographic camera, the combination with a camera casing, of a photographic lens system, a viewfinder, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges including a flash bulb operation, an automatic exposure operation and a manual diaphragm aperture adjustment, indicating means visible when looking into said viewfinder for indicating by means of distinctive marks to which one of said operating ranges the camera has been adjusted by said change-over ring, and another indicating means visible when looking into said viewfinder for indicating the value of the automatically adjusted diaphragm aperture, the value of the manually adjusted diaphragm aperture, and the selected shutter speed, said means indicating the adjusted operating range comprising a rotatably mounted disc provided with a plurality of marks each of which designates one of said different operating ranges, and means operatively connecting said disc with said change-over ring.

26. In a photographic camera, the combination with a camera casing, of a photographic lens system, a viewfinder, an exposure meter, an adjustable diaphragm, means for providing for flash bulb operation, a distance adjusting ring arranged concentrically about the optical axis of said lens system, a manually operable change-over ring for selectively adjusting said camera to any one of a number of different operating ranges including a flash bulb operation, an automatic exposure operation and a manual diaphragm aperture adjustment, indicating means visible when looking into said viewfinder for indicating by menas of distinctive marks to which one of said operating ranges the camera has been adjusted by said change-over ring, and another indicating means visible when looking into said viewfinder for indicating the value of the automatically adjusted diaphragm aperture, the value of the manually adjusted diaphragm aperture, and the selected shutter speed, said first mentioned indicating means comprising a rotatably mounted disc provided with a plurality of marks each of which designates one of said different operating ranges, a pivotally mounted lever of which one end is in geared connection with said disc while the other end of said lever loosely engages a rotatably mounted cam which is in geared connection with said change-over ring.

References Cited by the Examiner
UNITED STATES PATENTS 3,016,811 1/62 Bundschuh ______________ 95—10
3,063,352 11/62 Engelsmann ____________ 95—10

NORTON ANSHER, *Primary Examiner.*
EMIL G. ANDERSON, *Examiner.*